Sept. 5, 1950 H. H. WELD 2,521,619
GROOVING OR NECKING MECHANISM
Filed Jan. 2, 1947 2 Sheets-Sheet 1

Inventor
Henry H. Weld
Wright, Brown, Quinby & May
Attys

Sept. 5, 1950 H. H. WELD 2,521,619
GROOVING OR NECKING MECHANISM
Filed Jan. 2, 1947 2 Sheets-Sheet 2

Inventor
Henry H. Weld
by Wright Brown Quinby Alley
Attys

Patented Sept. 5, 1950

2,521,619

UNITED STATES PATENT OFFICE 2,521,619

GROOVING OR NECKING MECHANISM

Henry H. Weld, Windsor, Vt., assignor to Cone Automatic Machine Company Inc., Windsor, Vt., a corporation of Vermont Application January 2, 1947, Serial No. 719,807

1 Claim. (Cl. 77—3)

This invention relates to the cutting of grooves, particularly in internal work, and has for an object to provide a mechanism for cutting such grooves formed as an attachment for automatic lathes having either single or multiple spindles.

Another object is to provide such a mechanism adjustable for cutting grooves of different depths and at different rates of feed.

A further object is to provide such an attachment which is rigid so as to avoid chattering.

Still another object is to provide for swinging the grooving tool into or out of the work on an arc through an eccentric motion.

Figures 1, 2:
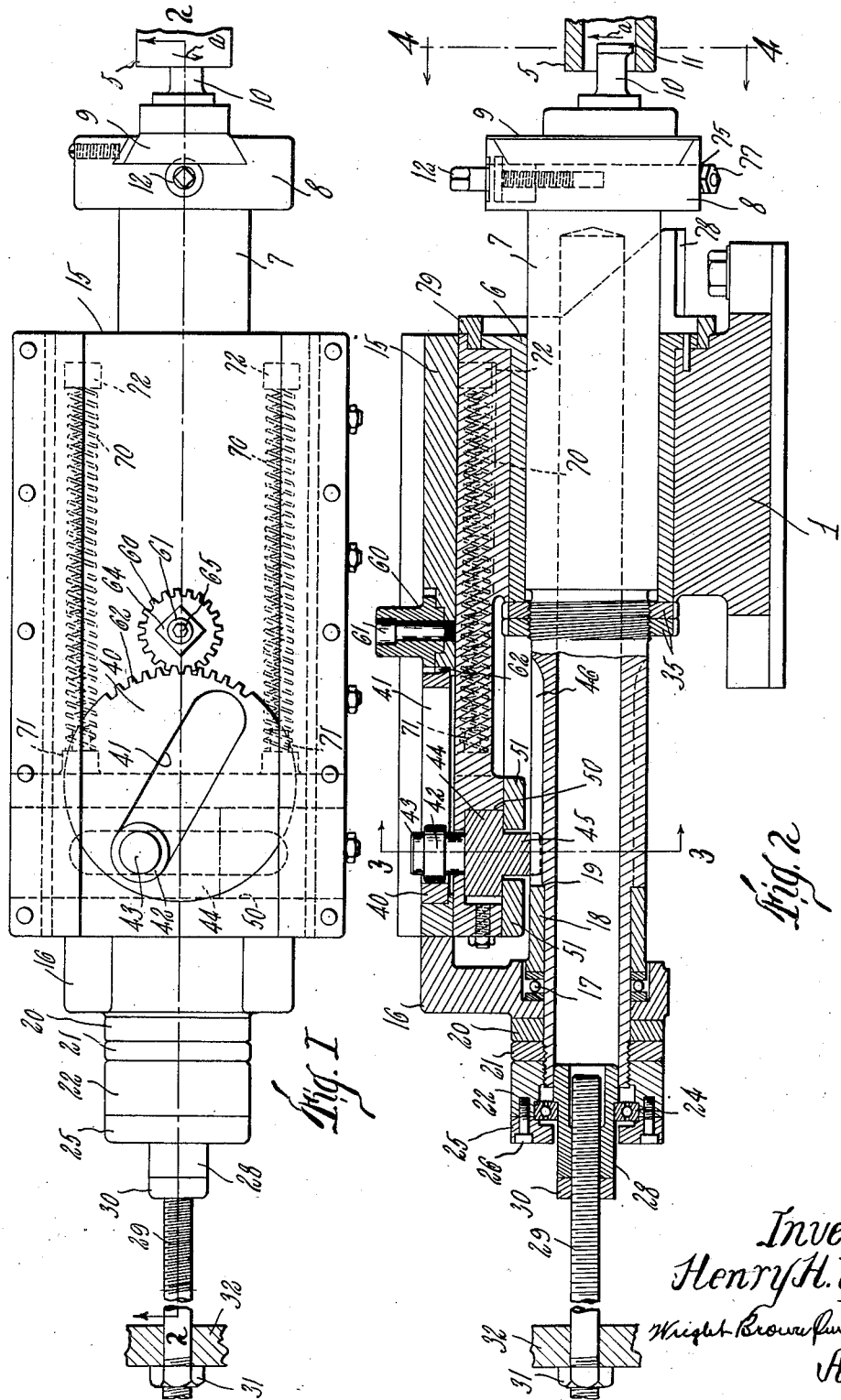

Further objects and advantages will appear from a description of an embodiment of the invention shown in the accompanying drawings in which Figure 1 is a top plan view of mechanism embodying the invention, the tool being positioned within the work ready for the grooving or necking operation.

Figure 2 is a sectional view on line 2—2 of Figure 1.

Figure 4:
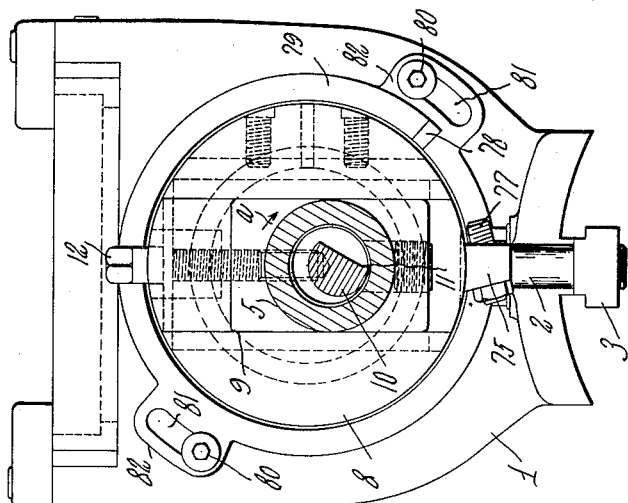
Figure 3:
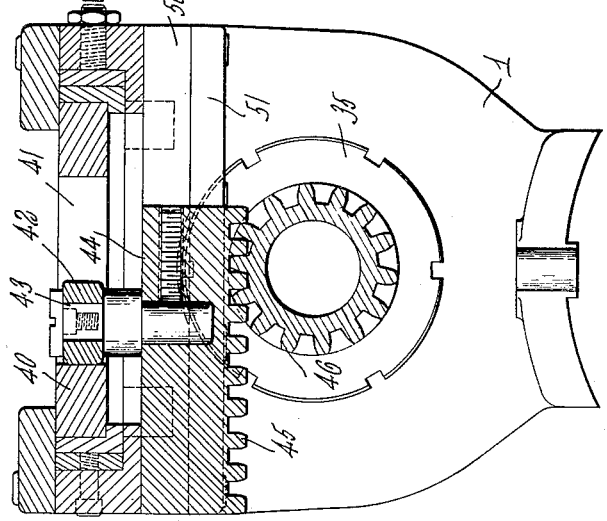

Figures 3 and 4 are sectional views on lines 3—3 and 4—4, respectively, of Figure 2.

Figure 5:
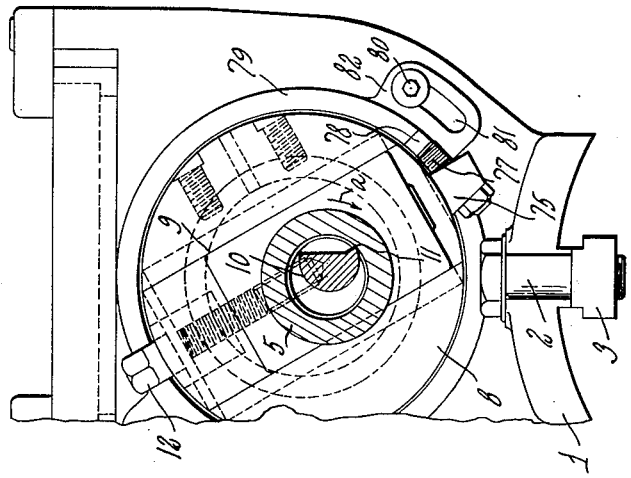

Figure 5 is a view similar to a portion of Figure 4, but showing the tool fed into the work to the maximum depth for which it is adjusted.

Referring to the drawings, at 1 is shown a support which is shaped to engage and be secured to a cylindrical tool slide of a multiple spindle lathe such as shown at 424 in the Miller Patent No. 2,236,440 granted March 25, 1941. For the purpose of securing this support to this tool slide, it is shown as provided with one or more bolts 2, each provided with a T head 3 adapted to engage in a T slot in the tool slide as is clearly shown in the Miller patent to which reference has been made. This tool slide is moved axially to present tools supported thereon into or out of operative relation to work pieces which are carried by rotary spindles arranged with their axes parallel to the line of motion of the tool slide. One of these spindles may carry a work piece 5 shown in Figures 1, 2, 4 and 5, the work piece being rotated in the direction of the arrows a shown in these figures.

The support 1 is provided with a bushing 6 within which is rotatable and axially slidable a hollow shaft 7. This shaft is arranged parallel to the axis of the work piece in operative relation thereto, but out of coaxial relation. The end of the shaft 7 nearest to the work pieces is provided with a head 8 across which is adjustable a tool slide 9 from which extends outwardly a necking or grooving tool 10 having a cutting edge 11 in position to be presented to the work piece to accomplish the grooving or necking operation. The slide 9 may be adjusted to present the tool edge 11 into the proper position by means of a screw 12 in a manner well understood in the art.

The support 1 has slidably mounted thereon in the lengthwise direction of the shaft 7, a slide 15. The slide 15 is provided with a downward extension 16 at its outer end within which the shaft 7 is journaled, as on the ball bearing 17, but the shaft 7 is held against relative axial motion with respect to the slide by a sleeve 18 engaging an annular shoulder 19 of the shaft 7, a collar 20 outwardly of the slide, and a pair of nuts 21 and 22 threaded on the rear extremity of the shaft 7. The nut 22 carries the outer raceway of a ball bearing 24 which is clamped in position by means of a ring 25 secured by screws 26 to the nut 22. The inner raceway of this bearing 24 is secured to an internally threaded sleeve 28 threaded on a screw 29 and secured in adjustable position therealong by the tightening of a nut 30 also threaded on the screw 29 and engaging the outer end of the sleeve 28. The screw 29 is a stop screw and has threaded on its outer end portion a nut 31 which may at suitable times engage a fixed stop member 32 through which the screw 29 is slidably mounted. Engagement of this nut 31 on the stop 32 limits the inward motion of the shaft 7 with its tool 10 to the desired point between the ends of the work piece as shown in Figure 2.

The shaft 7 with its tool may be retracted, however, carrying with them the slide 16 until such time as a pair of nuts 35 threaded on a portion of the shaft 7 is brought against a shoulder portion 51 of the support 1, this limiting the retracted position of the tool away from the work piece. These parts are so adjusted that in the angular position of the shaft 7 shown in Figures 1, 2, 3 and 4, the cutting edge 11 of the tool when the tool is in its inward position shown is out of contact with the work, but by rocking the shaft 7 the cutting edge 11 may be fed into the work as shown in Figure 5 due to the eccentric relation of this shaft to the axis of the work. This rocking of the tool into cutting relation with the work is accomplished by a further forward motion of the support 1 toward the work after the axial motion of the shaft 7 has been stopped by impingement of the stop nut 31, on the fixed member 32. To accomplish this, the slide 15 has journaled therein a disk 40 having a slot 41 extending diametrically nearly across it, this slot serving as a way in which rides a cam roller 42 which is journaled on the upper end of a post 43 carried by a rack bar slide 44 (see particularly Figures 2 and 3). This slide 44 has a rack portion 45 which meshes with pinion teeth 46 on a portion of the periphery of the shaft 7, these teeth being elongated so that the rack bar meshes therewith throughout the relative axial motions of the shaft 7 and the support 1. The rack bar 44 is mounted for motion in a lateral way 50 of the support 1 which has a pair of retaining strips 51 secured to the lower face of the support, holding the rack slide in position. The angular position of the slot 41 is adjustable in order to determine the amount of lateral motion which will be given to the rack slide 44 for any given relative sliding motion of the slide 15 and the support 1, and this, as shown, may be produced by the turning of a pinion 60 journaled on a headed post 61 threaded into the slide 15, this pinion having its teeth engaging mating teeth of a gear segment portion 62 of the disk 40. By loosening the post 61, the pinion 60 may be turned, as by placing over a squared portion 64 thereof a suitable wrench, and after the disk 62 has been adjusted to the desired angular position, the pinion 60 may be locked in the corresponding angular position by tightening the pivot post 61 in its threaded connection with the slide 15. For this purpose it is shown as provided with a polygonal socket 65 in its upper end for the reception of a correspondingly shaped wrench bar.

The slide 15 is normally held in its forward position with the nuts 35 engaging the rear end of the bushing 6, as by a pair of compression springs 70 engaging over the abutment posts 71 on the support 1 and engaging abutment blocks 72 projecting from the slide 15.

With the parts properly adjusted and with the work piece presented in tooling position, the support 1 is brought forward, carrying the shaft 7 and the tool therewith until the tool has been brought to a predetermined position between the ends of the work piece by the impingement of the stop nut 31 on the member 32, the parts being shown in this position in Figures 1 and 2. The shaft 7 is then in the angular position of Figures 2 and 4 with the cutting edge of the tool out of contact with the work. Further forward movement of the support 1 with the tool slide causes the support 1 to slide forwardly beneath the slide 15, causing the follower roll 42 to move within the guide slot 41 and producing a lateral travel of the rack bar 44 which rotates the shaft 7 in such a way that its eccentric relation to the work piece causes the tool edge to advance toward and into the work, cutting it to a depth determined by the angular position of adjustment of the disk 40 and the amount of travel of the support 1, the tool at this time remaining in the same axial relation with the work piece.

When the work has been cut to the desired depth, a stop lug 75 projecting from the shaft 7 at the forward face of the bushing 6 and supporting an adjustable stop screw 77 brings this screw by rocking of the shaft 7 against an abutment segment 78 as shown in Figure 5, which is carried by a ring 79 angularly adjustable about the axis of the shaft 7 and being secured in adjusted position by bolts 80 threaded into the support 1 and extending through slots 81 of ears 82 projecting from the ring 79. This provides a positive stop which accurately limits the depth of the cut.

On retraction of the support 1 with the tool carrier, the springs 70 cause the slide 15 to remain in its forward position during the initial retraction, this causing the shaft 7 to be rocked back to its initial position, after which the support and the slide move together, retracting the shaft 7 axially and removing the tool from between the ends of the work piece into position for a succeeding cycle of operations.

From the foregoing description of an embodiment of this invention, it should be evident to those skilled in the art that various changes and modifications might be made without departing from its spirit or scope.

I claim:

In combination, a support, a shaft journaled in said support, means for moving said support lengthwise of said shaft and of a work piece supported for rotation on an axis parallel to that of said shaft, a tool carried by said shaft and having a cutting edge eccentric to said shaft, means for limiting the axial motion of said support in opposite directions at one of which limits said tool is positioned between the ends of said work piece, a slide on said support within which said shaft is journaled for axial motion therewith, an actuating member carried by said support for guided motion transverse to the axis of said shaft and having a rack, said shaft having an elongated pinion portion in engagement with said rack to cause said shaft to be turned by motion of said actuating member, a control member carried by said slide and having a way angularly related to the axis of said shaft, said actuating member having an element engaging in said way, and spring means reacting between said slide and support tending to hold said slide retracted in position to retract said tool from the work.

HENRY H. WELD.

REFERENCES CITED

The following references are of record in the file of this patent:

UNITED STATES PATENTS

| Number | Name | Date |
| --- | --- | --- |
| 1,331,322 | Connell | Feb. 7, 1920 |
| 2,441,533 | Montgomery | May 11, 1948 |